---

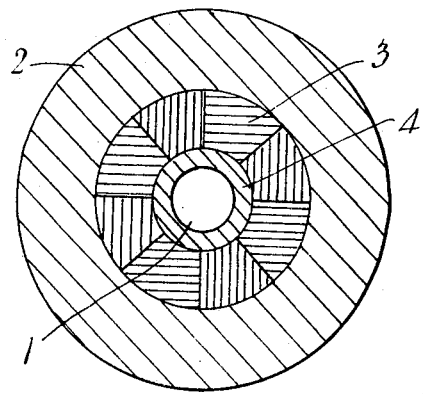
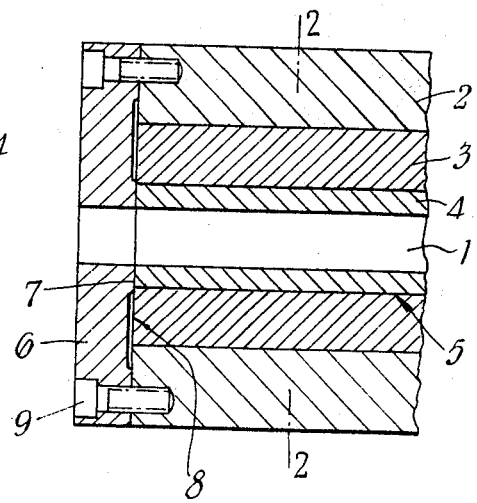
FIG. 2.
FIG. 1.
FIG. 3.
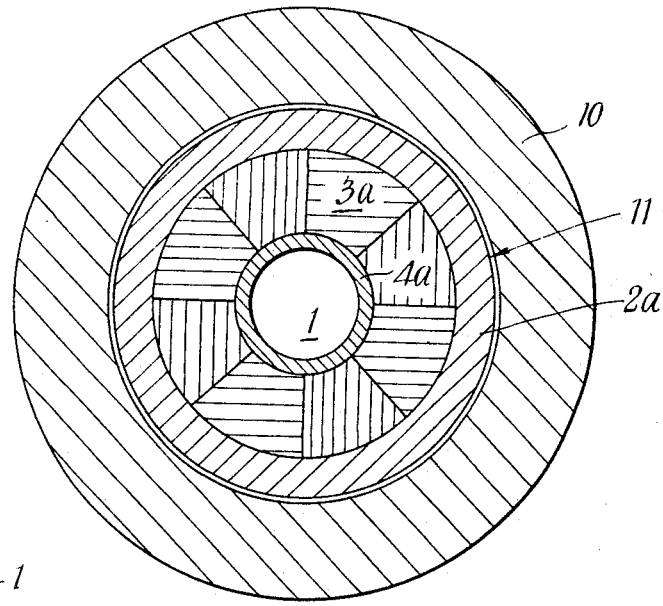
FIG. 4.
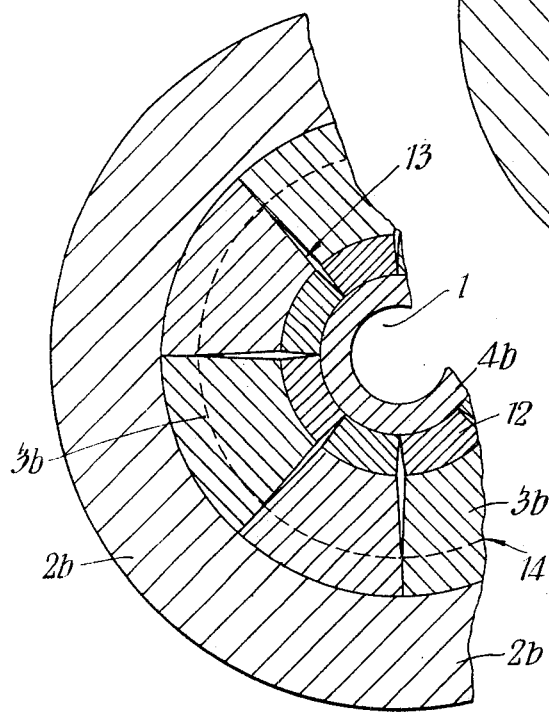
Inventor
John Antony Pennell
By
Pennie, Edmonds, Morton, Taylor & Adams
Attorneys

United States Patent Office 3,512,675
Patented May 19, 1970

3,512,675
MULTILAYER HIGH PRESSURE VESSELS
John Antony Pennell, Cumberland, England, assignor to National Research Development Corporation, London, England, a corporation of Great Britain
Filed Nov. 24, 1967, Ser. No. 685,387
Int. Cl. F25j 5/100; B65d 7/44; B23p 11/02
U.S. Cl. 220—3                                    9 Claims

ABSTRACT OF THE DISCLOSURE

High pressure vessel having a wall part of concentric layer construction in which at least one inner layer defining an internal vessel-chamber is surrounded by at least one backing layer made of material of appreciably higher elastic modulus than the material of said inner layer to distribute operative stress changes in said wall part through the wall layers to prevent excess stress change concentration in the wall part adjoining the chamber.

---

This invention relates to high pressure vessels suitable for applications such as isostatic pressing, hydrostatic extrusion and hydrostatic bulging, and is concerned with facilitating the construction of such vessels.

High-pressure vessels must be capable of withstanding repeated high pressures without failure, such as from fatigue. Since fatigue failure is caused primarily by the change of stress as the pressure in the pressure vessel is cycled alternatively between its maximum and minimum values, it is necessary to minimise the stress-range at all points within the vessel. In particular reduction of the internal pressure in the vessel from a maximum to a lower value during an operating cycle causes elastic contraction of the vessel. This contraction in turn normally introduces high compressive residual hoop stresses in the vessel material near the inner wall surface thereof giving rise to a very high range of shear stress fluctuations at this point, tending to initiate fatigue cracks at the vessel inner wall surface leading to fatigue failure of the vessel. Generally, known high pressure vessels have unsatisfactory fatigue strengths unless used for very low maximum pressures or made with large overall vessel diameters and are thus not suitable for use in compact high pressure apparatus.

It is the main object of the invention to facilitate the construction of compact high-pressure vessels having high fatigue strength.

Accordingly the invention provides a high pressure vessel having a wall part composed of at least one inner layer shaped to define an internal bore or chamber within the vessel and at least one backing layer which concentrically surrounds said inner layer or layers and is made of material of appreciably higher elastic modulus than the material of said, inner layer or layers, the arrangement being such that stress changes resulting from pressure variation in the vessel are sufficiently distributed through the wall layers to prevent excessive concentration of said stress changes in the wall part adjoining said bore or chamber.

For a better understanding of the present invention and to show how the same may be carried into effect, reference will now be made by way of example to the accompanying drawings in which:

FIG. 1 is a partly broken away longitudinal section of a first embodiment of a high pressure vessel of the present invention, FIG. 2 is a cross-section taken on the line 2—2 of FIG. 1, FIG. 3 is a cross-section of a second embodiment of a high pressure vessel of the invention, and FIG. 4 is a partly broken away cross-section of a third embodiment of a high pressure vessel of the invention.

In the drawings the invention is illustrated as applied to high pressure vessels of generally cylindrical form, in which the pressure developed may be of the order of 150–250 tons per square inch. It must be appreciated however that the invention is also applicable to vessels having a generally spherical or otherwise non-cylindrical form.

Referring now to FIG. 1 of the drawings, a first embodiment of the invention as shown, is a substantially cylindrical high pressure vessel having a wall part composed of at least one inner layer 4 shaped to define an internal bore or chamber 1 within the vessel, in which bore pressure is to be developed. The vessel wall part also includes at least one backing layer 3 which concentrically surrounds the inner layer 4 and is made of material of appreciably higher elastic modulus than the material of the layer 4. In this connection a ratio of more than 1.5 to 1 is generally desired between the elastic moduli of the backing layer 3 and the inner layer 4.

At least one outer layer 2 surrounds the backing layer 3 and has a lower elastic modulus than the backing layer 3. This layer 2 may be of mono-block, composite wire wound, auto-frettaged or segmented construction, employing a material such as a relatively ductile steel of low elastic modulus. The backing layer 3 of the vessel is conveniently made of a plurality of radially abutting segmented blocks of cemented tungsten carbide. Alternatively the layer 3 could be a solid ring of high elastic modulus material such as tungsten carbide, or could be sub-divided axially into rings of segments, for ease of manufacture.

The inner layer 4 is conveniently sleeve-like in form and is made of low elastic modulus/high strength material such as tool steel, maraging steel or titanium, in order to withstand radial pressure. The outer layer 2 is assembled so as to be sufficiently prestressed against the backing layer 3 when the vessel is in an unloaded or de-pressurised state so as to prevent the radial faces of the blocks in the layer 3 moving apart under normal vessel working pressures. However, the design of the blocks is such that at a critical pressure higher than the normal working pressure, the radial faces of the blocks move apart, approximately simultaneously at all radii (that is throughout the layer thickness). Such a block arrangement ensures that the backing layer 3 has maximum rigidity under cyclic pressure and also minimises the wall-thickness of layer 2 that is required to support the blocks.

In this way the innermost layer or sleeve 4 is constrained by the layer 3, which has only a low degree of radial expansion under pressure, so that a very low cyclic hoop stress is developed in the sleeve 4. This low cyclic hoop stress minimises fatigue failure of the sleeve 4. If the sleeve 4 is slightly prestressed in the layer 3, for example with about 0.002 inch per inch of diameter interference, then tensile hoop stresses in the sleeve 4 can be virtually eliminated, thereby further improving the resistance of the sleeve to fatigue failure. By making the sleeve 4 thin, relative to the layers 2 and 3, cyclic axial strains in the sleeve are limited to those of the more rigid layer 3, due to frictional contact at an interface 5. These strains are very small, and the axial constraint gives rise to compressive axial stresses in the sleeve 4 at vessel working pressures, which stresses also help to increase the fatigue resistance of the sleeve.

It has been found that near the vessel ends, the friction at the interface 5 is insufficient to prevent relative axial slip being developed between the layer 3 and the sleeve 4. Such relative motion is prevented by clamping plates 6 to the vessel ends which plates respectively support the ends of the sleeve 4 as shown at 7. Each end or clamping plate 6 is pre-stressed sufficiently to prevent movement of the sleeve 4 relative to the adjoining end face 8 of the layer 3 under maximum working pressure, and is thus able to support maximum compressive axial stress developed in the sleeve 4 under non-slip conditions. Also each plate 6 may incorporate seals (not shown) in which case it is necessary for the plates 6 additionally to support seal reaction without moving., Due to the rigidity of the layer 3, cyclic stresses are reduced in the less rigid layers, including the outer layer 2 and the sleeve 4. Thus fatigue failure of the layer 2 is substantially eliminated enabling outer layers of a vessel of the invention to be designed for static strength with low overall diameters and high stresses. The reduction of cyclic stresses means that the outer layer 2 can be tapped at its ends, to enable plate mounting bolts 9 (or other fixing means) to be screwed into the layer 2 without the tapped holes giving rise to stress concentrations sufficient to initiate fatigue failure. The holes need also have little effect on the static strength of the outer layer or layers.

Referring now to FIG. 3 the invention shown therein is intended for operation under internal and external pressures at the same time, which pressures may be cyclic and in phase. Such a vessel may conveniently form one component of a multi-component fluid-interface pressure vessel. In this embodiment layer 2a, layer 3a (which may alternatively be a solid ring) and innermost layer 4a are respectively similar in function to layers 2, 3 and 4 of the first embodiment. However in this case the layers 2a, 3a and 4a, which together can be considered as an inner vessel-component are housed within a casing 10, which may possibly be a further composite vessel. A cyclic pressure is then developed at an interface 11 in pressure medium arranged in an annular gap between the layer 2a and the casing 10.

This cyclic pressure developed at the interface 11 acts externally on the inner vessel-component and the externally applied pressure has the effect of reducing the stress-range in the layers 2a, 3a and 4a of the inner vessel-component for a given cyclic internal pressure. In this way the inner vessel-component is only subject to the difference between the external and internal pressures with the result that it may be unnecessary to make the layer 3a from material such as tungsten carbide having a high elastic modulus and a material of lower elastic modulus, such as tool steel, may be employed for the layer 3a. Similarly the inner layer 4a can be made of a material with a high ratio of strength to elastic modulus such as titanium, rubber, plastics or glass, but in this case axial constraint of the layer 4a by the layer 3a gives rise to very high axial stresses in the layer 4a. End-plates (not shown) similar to end plates 6 of the first embodiment are again employed and need accordingly be of greater strength than the plates of the first embodiment to sustain the larger end forces. The ratio of the elastic modulus of the backing layer 3a to the elastic modulus of the inner layer 4a is greater than in the first embodiment.

In the third embodiment of the invention as shown in FIG. 4, the vessel includes an outer layer 2b of low elastic modules material, a backing layer 3b of radially abutting segmented blocks of high elastic modules material such as cemented tungsten carbide and an innermost layer 4b of low elastic modulus material such as tool steel, as in the first embodiment. However, in this embodiment an anti-fretting layer 12, of radially abutting segmented blocks of low elastic modulus material such as tool steel, is positioned between the layer 3b and the inner layer 4b. As in the previous embodiments cyclic stresses are deliberately concentrated in the rigid layer 3b to reduce the stressrange in the other more flexible layers. This may tend to overload the rigid layer 3b although this is of very high strength.

To counteract such possible overloading the radial faces of the blocks of the layer 3b are so profiled that a controlled gap 13 is allowed to open between each pair of abutting radial faces of the backing layer blocks, which gaps at peak vessel pressure extend radially from the inner surface of the backing layer blocks to an intermediate circumference 14 within the layer 3b. In this way cyclic stresses can be distributed uniformly throughout the layer 3b the stress-range in the region between the inner surface of the layer 3b and the intermediate circumference 14 being controllable accurately to be within the limits of the fatigue strength of the layer material. A special block profile is required to this end, such a profile being determined from the elastic deformation of the blocks under the desired loading, bearing in mind that the gaps are required to close up at a zero internal pressure.

The layer 12 located as aforesaid has blocks so profiled that no gaps are open at any time at the innermost surface of this layer 12. This arrangement prevents fretting between the inner surface of the segmented anti-fretting layer 12 and the adjacent continuous innermost layer 4b. Alternatively the layer 12 may be dispensed with and fretting prevented between the layers 3b and 4b by using a large number of segmented blocks of small included angle to make up the layer 3b so that the gaps 13 may be reduced in width.

I claim:

1. A high pressure vessel having a wall part composed of at least one inner layer made from any one of the group consisting of tool steel, maraging steel and titanium and shaped to define an internal chamber within the vessel having a generally cylindrical bore at least one backing layer concentrically surrounding said inner layer and made from cemented tungsten carbide material of appreciably higher modulus of electricity than the material of said inner layer whereby stress changes resulting from pressure variation in the vessel are sufficiently distributed through the layers to prevent excessive concentration of said stress changes in the wall part adjoining said chamber, and at least one outer layer of relatively ductile steel which surrounds said backing layer and has a lower modulus of elasticity than said backing layer.

2. A high pressure vessel according to claim 1 wherein said backing layer is formed by a plurality of radially abutting segmented blocks.

3. A high pressure vessel according to claim 2, in which the wall part has an innermost layer in the form of a sleeve, and clamping plates secured to the vessel ends so as to support said sleeve.

4. A high pressure vessel according to claim 3 in which said outer layer is prestressed against said backing layer to prevent gaps opening between abutting radial faces of said blocks at normal vessel working pressure, the backing layer is prestressed against said inner layer, substantially to remove tensile hoop stresses at least from said sleeve and each clamping plate is prestressed against the respective vessel end to prevent outward axial movement of the sleeve relative to the backing layer.

5. A high pressure vessel having a wall part comprising an innermost layer defining a generally cylindrical bore-shaped internal chamber within the vessel, at least one backing layer which concentrically surrounds said innermost layer and is most of material of appreciably higher modulus of elasticity than the material of said innermost layer whereby stress changes resulting from pressure variation in the vessel are sufficiently distributed through the wall layers to prevent excessive concentration of said stress changes in the wall part adjoining said chamber, at least one outer layer tightly surrounding said backing layer, at least one casing loosely surrounding said outer layer to define an annular gap between said outer layer and casing for containing pressure medium, and clamping plates securable to the vessel ends to support said innermost layer.

6. A high pressure vessel according to claim 5, wherein the inner layer is made from any one of the group consisting of rubber, titanium, plastics and glass, the backing layer is formed by a plurality of radially abuting segmented blocks of tool steel, and the outer layer and casing are made of relatively ductile steel.

7. A high pressure vessel having a wall part defining a generally cylindrical bore-shaped chamber and comprising two concentric inner layers disposed one within the other and made from any one of the group consisting of tool steel, maraging steel and titanium, the outer of said inner layers being an anti-fretting layer of radially abutting segmented blocks so profiled as to prevent gaps opening between abutting radial block faces at the innermost surface of the anti-fretting layer, a backing layer formed by a plurality of radially abutting segmented blocks of cemented tungsten carbide concentrically surrounding said inner layers, and an outermost layer of relatively ductile steel concentrically surrounding the backing layer and having a lower modulus of elasticity than the said backing layer.

8. A high pressure vessel according to claim 7 wherein radial faces of the backing layer blocks are profiled so as to cause a controlled gap to open between each pair of abutting radial faces of said backing layer blocks during vessel operation, which gaps at peak vessel pressure extend from the inner surface of the backing layer to an intermediate circumference within said backing layer.

9. A high pressure vessel having a wall part comprising at least one inner layer shaped to define an internal chamber within the vessel and at least one backing layer which concentrically surrounds said inner layer and is made of material of appreciably higher modulus of elasticity than the material of said inner layer whereby stress changes resulting from pressure variation in the vessel are sufficiently distributed through the wall layers to prevent excessive concentration of said stress changes in the wall part adjoining said chamber, and wherein the backing layer is surrounded by an outer layer of material having a lower modulus of elasticity than those of the inner layer and the backing layer.

References Cited
UNITED STATES PATENTS

| | | | |
|---|---|---|---|
| 2,360,391 | 10/1944 | Birchall | 220—3 |
| 3,023,495 | 3/1962 | Noland | 220—3 X |
| 3,068,562 | 12/1962 | Long. | |
| 3,207,352 | 9/1965 | Reinhart | 220—83 X |
| 3,268,103 | 8/1966 | Nelson | 220—3 |
| 3,280,775 | 10/1966 | Krenzke | 220—71 X |
| 3,329,297 | 7/1967 | Jordan | 220—63 X |
| 2,652,943 | 9/1953 | Williams | 220—3 |

RAPHAEL H. SCHWARTZ, Primary Examiner

U.S. Cl. X.R.

220—83

PO-1050
(5/69)

UNITED STATES PATENT OFFICE
CERTIFICATE OF CORRECTION

Patent No. 3,512,675           Dated May 19, 1970

Inventor(s) John Antony Pennell

It is certified that error appears in the above-identified patent and that said Letters Patent are hereby corrected as shown below:

Column 4, line 22, change "reducted" to --reduced--;

line 34, (claim 1, line 11) before layers insert --wall--;

line 60, (claim 5, line 5) change "most" to --made--.

Signed and sealed this 2nd day of November 1971.

(SEAL)
Attest:

EDWARD M. FLETCHER, JR.           ROBERT GOTTSCHALK
Attesting Officer                 Acting Commissioner of Patents